(12) United States Patent
Hollis

(10) Patent No.: US 8,363,707 B2
(45) Date of Patent: Jan. 29, 2013

(54) MIXED-MODE SIGNALING

(75) Inventor: Timothy M. Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 1349 days.

(21) Appl. No.: 12/053,387

(22) Filed: Mar. 21, 2008

(65) Prior Publication Data

US 2009/0239559 A1    Sep. 24, 2009

(51) Int. Cl.
*H04B 1/38* (2006.01)
(52) U.S. Cl. ........... 375/222; 455/283; 455/500; 327/65
(58) Field of Classification Search ............. 375/222, 375/257, 285, 295, 345; 455/280, 283
See application file for complete search history.

(56) References Cited

U.S. PATENT DOCUMENTS

| | | | |
|---|---|---|---|
| 6,295,323 B1 | 9/2001 | Gabara | |
| 6,573,760 B1 | 6/2003 | Gabara | |
| 6,813,483 B1 * | 11/2004 | Lynch et al. | 455/283 |
| 7,126,378 B2 | 10/2006 | Stojanovic et al. | |
| 7,292,637 B2 | 11/2007 | Ho et al. | |
| 7,330,514 B1 * | 2/2008 | Ahmad | 375/285 |
| 2005/0227476 A1 * | 10/2005 | Inoue | 438/618 |
| 2005/0285683 A1 * | 12/2005 | Drost et al. | 330/302 |
| 2006/0146921 A1 * | 7/2006 | Vermeersch et al. | 375/222 |
| 2008/0298520 A1 * | 12/2008 | Hsu et al. | 375/345 |
| 2009/0110109 A1 * | 4/2009 | Skerlj | 375/295 |
| 2009/0160559 A1 * | 6/2009 | Ravezzi et al. | 330/301 |

FOREIGN PATENT DOCUMENTS

| | | |
|---|---|---|
| EP | 1 376 747 A2 | 1/2004 |
| WO | WO 2005/062469 A1 | 7/2005 |

OTHER PUBLICATIONS

Ho et al., "Common-mode backchannel signaling system for differential high-speed links", *IEEE* Symposium on VLSI Circuits Digest of Technical Papers, 21.4, pp. 352-355, 2004.
Stojanovic et al., "Autonomous dual-mode (PAM2/4) serial link transceiver with adaptive equalization and data recovery", *IEEE Journal of Solid-State Circuits*, vol. 40, No. 4, pp. 1012-1026, Apr. 2005.

* cited by examiner

*Primary Examiner* — Leon-Viet Nguyen
(74) *Attorney, Agent, or Firm* — Knobbe, Martens, Olson & Bear LLP

(57) ABSTRACT

Methods and apparatus are disclosed, such as those involving mixed-mode signaling that includes transmitting a differential signal and a common mode signals over the same pair of interconnect traces. One such apparatus includes a first transmitter configured to transmit a differential signal through a pair of electrically conductive lines in a first direction. The differential signal has a first frequency and carries electronic data. The apparatus further includes a second transmitter configured to transmit a common mode signal through the pair of electrically conductive lines in the first direction. The common mode signal is superimposed onto each of the differential signal. The common mode signal has a second frequency that is lower than the first frequency and carries a control signal. This configuration reduces the number of lines and pins on electronic circuits, thereby saving space thereon.

30 Claims, 6 Drawing Sheets

MIXED-MODE SIGNALING

BACKGROUND OF THE INVENTION

1. Field of the Invention

Embodiments of the invention relate to electronic systems, and more particularly, in one or more embodiments, to signal transmission in electronic systems.

2. Description of the Related Art

In electronic data transmission, various schemes have been used to enhance the accuracy of data transmission over unwanted noise. Among such schemes, differential signaling has been widely used. Differential signaling refers to a scheme in which a transmitting component sends two signals having opposite polarity to each other to a receiving component over a channel that includes a pair of electrically conductive lines. The receiving component detects a difference between the two signals and determines the state of the signals. Because the two signals are affected by noise to substantially the same degree, the scheme can substantially reduce transmission errors due to noise.

As the geometry of electronic devices (e.g., integrated circuits) has been downscaled, there have been attempts to reduce space for data channels. Differential signaling, however, requires at least two lines per data channel. Furthermore, in certain applications using a differential signaling scheme, separate lines for control signals are also needed for the operation of the receiving component in addition to the data channels.

BRIEF DESCRIPTION OF THE DRAWINGS

The embodiments will be better understood from the Detailed Description of Embodiments and from the appended drawings, which are meant to illustrate and not to limit the embodiments, and wherein:

FIG. 4 is a circuit diagram illustrating a common mode signal extractor according to one embodiment; and.

DETAILED DESCRIPTION OF EMBODIMENTS

In one embodiment, a signaling scheme uses both differential signaling and common mode signaling over the same pair of electrically conductive lines. A differential signal is transmitted over the pair of electrically conductive lines, and a common mode signal is superimposed onto the differential signal. In the context of this document, such a scheme may be referred to as mixed-mode signaling.

The differential signal can have a first frequency, while the common mode signal can have a second frequency that is lower than the first frequency. The second frequency may be at least 8 times as low as the first frequency.

In one embodiment, the differential signal can carry data while the common mode signal can carry control signals. In general, the control signals may include control information for controlling the operation of a component receiving the data carried by the differential signal. In other embodiments, the control signals can include information on a status of the data.

In one embodiment, the control signals can include information indicative of a status of the data carried by the differential signal. One example of such control signals is a data bus inversion (DBI) signal indicating whether digits in the data have been inverted for transmission over the channel.

Figure 1:
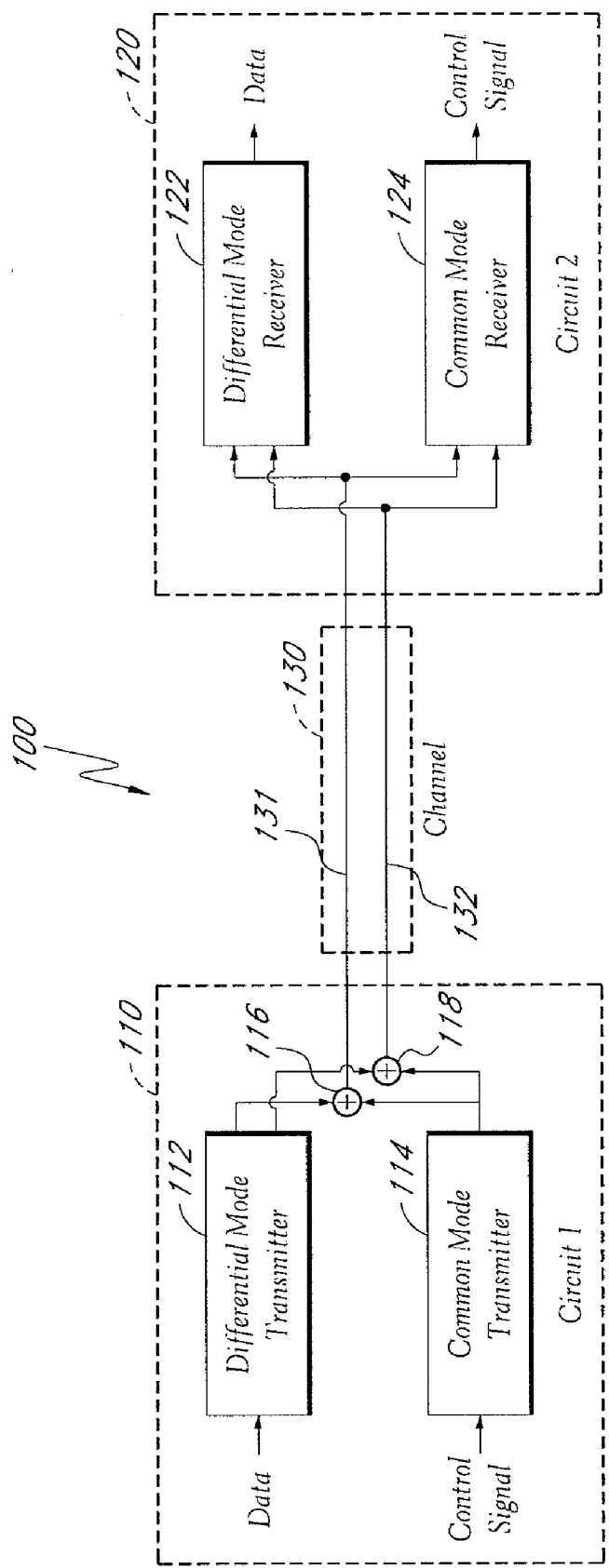
FIG. 1 is a block diagram of a signal transmission system according to one embodiment.

In other embodiments, the control signal can include one or more control signals associated with the operation of the receiving circuit (e.g., the second circuit of FIG. 1). Examples of such control signals include, but are not limited to, a chip select (CS) signal, a power down signal, and a data mask signal. A skilled artisan will, however, appreciate that various other types of control signals can be transmitted in the form of a common mode signal over the channel 130.

Referring to FIG. 1, a system or apparatus employing a mixed-mode signaling scheme according to one embodiment will now be described. The illustrated system 100 includes a first circuit 110, a second circuit 120, and a channel 130 interconnecting the first and second circuits 110, 120. The channel 130 includes a pair of electrically conductive lines: a first line 131 and a second line 132. Although not illustrated, the system may further include additional transmitters, receivers, and channels, depending on the design of the system.

The first circuit 110 includes a differential mode transmitter 112, a common mode transmitter 114, a first adder 116, and a second adder 118. In the illustrated embodiment, the differential mode transmitter 112 receives data in a single-ended form (though it could easily operate on differential data as well), and converts it into a differential signal. The differential mode transmitter 112 provides the differential signal to the first and second adders 116, 118. The common mode transmitter 114 receives and buffers a control signal in a single-ended form. The common mode transmitter 114 provides the common mode signal to the first and second adders 116, 118.

The first adder 116 superimposes the common-mode signal with one half of the differential signal, thereby providing a first composite signal to the first line 131. The second adder 118 superimposes the other common-mode signal with the other half of the differential signal, thereby providing a second composite signal to the second line 132.

The channel 130 includes the first line 131 and the second line 132. The first and second lines 131, 132 have substantially the same length and electrical conductivity. The length of the channel 130 can vary widely depending on the distance between the first and second circuits 110, 120. In one embodiment, the length of the channel 130 can be between about 100 µm and about 10 mm. In another embodiment, the length of the channel 130 can be greater than 10 mm.

The second circuit 120 includes a differential mode receiver 122 and a common mode receiver 124. The differential mode receiver 122 receives the first and second composite signals from the first and second lines 131, 132 of the channel 130, and detects the differential signal. The differential mode receiver 122 converts the differential signal, if necessary, back into the original data in a single-ended form. The common mode receiver 124 receives the first and second composite signals from the first and second lines 131, 132 of the channel 130, and extracts the common mode signal. The common mode receiver 124 also amplifies the extracted common mode signal to CMOS levels.

Neither the common mode nor the differential signal may swing rail-to-rail if the superposition of the two is to be contained within the rails. In general, the differential swing and common mode swing should be less than or equal to half of each available supply voltage, thereby summing to the full supply voltage. In some embodiments, the signal swings may be kept even smaller to minimize power (⅓ and ⅓ swings). While this would be the general case, there might also be asymmetry between the swings of the two types of signals. In one embodiment, the differential signal may swing a few hundred millivolts peak to peak while the common mode signal may swing more than five hundred millivolts to compensate for its single ended nature. In other embodiments, this might be reversed with the common mode signal being smaller than the differential signal.

In the illustrated embodiment, the system 100 provides unidirectional signal transmission, i.e., signal transmission in one direction from the first circuit 110 to the second circuit 120. In another embodiment, the first circuit 110 may further include a differential mode receiver and a common mode receiver. In addition, the second circuit 120 may further include a differential mode transmitter and a common mode transmitter. The transmitters in the second circuit 120 can transmit signals to the receivers in the first circuit 110 over the same or a distinct channel, thereby permitting bi-directional signal transmission between the first and second circuits 110, 120.

The illustrated system 100 can be implemented in a single component, e.g., a single integrated circuit (IC) chip, across a single printed circuit board (PCB), etc. In one embodiment, the system 100 can include multiple dies stacked over one another. Each of the dies can include an integrated circuit thereon. In such an embodiment, the dies can include vias penetrating therethrough with electrically conductive plugs filling the vias. The plugs can electrically interconnect the ICs on the dies, forming channels between the ICs.

In another embodiment, the system 100 can be implemented in two separate electronic components, for example, the first circuit 110 can be in a component while the second circuit 120 is in another component. In certain embodiments, the system 100 may include three or more circuits which are capable of unidirectional or bi-directional signal transmission between two or more of them.

Referring to FIG. 2, the differential signal transmitted over the first and second lines 131, 132 of FIG. 1 includes complementary signals, which do not necessarily exhibit opposite polarities. For example, the complementary signals may transition between the full positive supply level and a second level midway between the positive supply level and ground, with the true signal representing binary 1s and 0s with the fall positive supply level and the midpoint level, respectively, and the corresponding complementary signal representing binary 1s and 0s with the midpoint voltage and the full positive supply level, respectively.

Figures 2A, 2B, 2C:
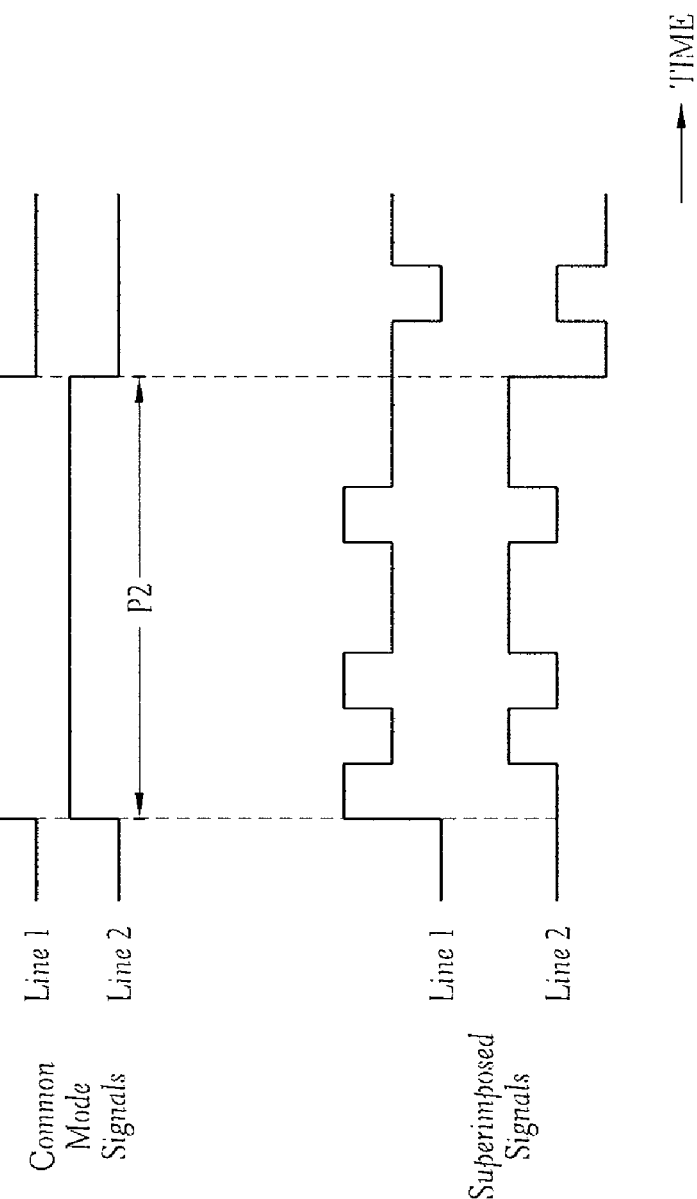
FIGS. 2A and 2B are timing diagrams illustrating differential signals and common mode signals, respectively, that are transmitted in the system of FIG. 1.
FIG. 2C is a timing diagram illustrating superimposed signals traveling over the channel of FIG. 1.

The common mode signals transmitted over the same first and second lines 131, 132 should have substantially the same waveform and polarity as each other. The differential and common mode signals can have any suitable waveform, not only limited to the square waveforms as shown in FIGS. 2A and 2B. The common mode signal is superimposed onto the differential signal while being transmitted over the channel 130.

The differential signal can have a first frequency f1 and a first period P1, while the common mode signals can have a second frequency f2 and a second period P2. In one embodiment, the first frequency f1 can be higher than the second frequency f2, i.e., the first period P1 can be shorter than the second period P2. In one embodiment, the first frequency f1 is at least 8 times as high as the second frequency, i.e., the first period P1 is at least 8 times shorter than the second period P2. A skilled artisan, however, will appreciate that the frequencies f1, f2 can have various frequency ratios depending on the system design.

One advantage of maintaining the frequency of the common mode signal lower than that of the differential signal is that the common-mode rejection of the differential receiver is better at lower frequencies. Thus, lower frequency common-mode signals are more easily distinguished from higher frequency differential signals. On the other hand, common-mode signals having a frequency substantially the same as or higher than the frequency of the differential signals are more difficult to separate from differential signals.

Figure 3:
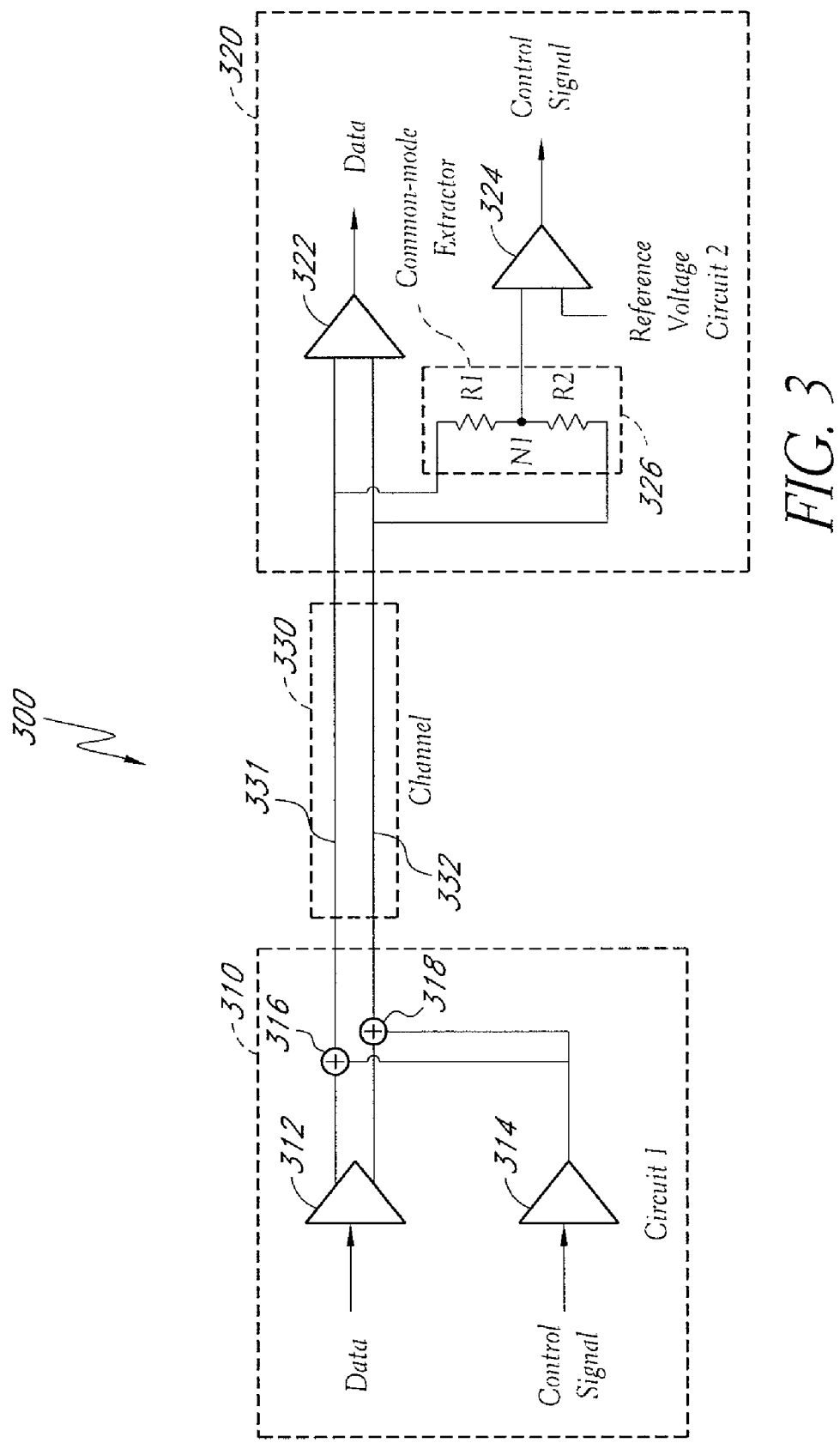
FIG. 3 is a circuit diagram of a signal transmission system using voltage mode signaling according to one embodiment.

Referring to FIG. 3, a circuit diagram of a system (or apparatus) employing a mixed-mode signaling scheme according to one embodiment will now be described. The illustrated system 300 uses a voltage-mode signaling scheme. The system 300 includes a first circuit 310, a second circuit 320, and a channel 330 interconnecting the first and second circuits 310, 320. The channel 330 includes a pair of electrically conductive lines: a first line 331 and a second line 332. Although not illustrated, the system 300 may further include additional transmitters, receivers, and channels, depending on the design of the system.

The first circuit 310 includes a first output driver 312, a second output driver 314, a first adder 316, and a second adder 318. The first output driver 312 serves as a differential mode transmitter while the second output driver 314 serves as a common mode transmitter.

The first output driver 312 receives electronic data in a single-ended form, and converts it into a differential signal based on the waveform of the electronic data. The first output driver 312 provides the differential signal to the first and second adders 316, 318.

The second output driver 314 receives and buffers a control signal in a single-ended form. The second output driver 314 provides a common mode signal to the first and second adders 316, 318 in response to the control signal.

The first adder 316 superimposes the common-mode signal onto one half of the differential signal, thereby producing a first composite signal. The first adder 316 provides the first composite signal to the first line 331. The second adder 318 superimposes the common-mode signal onto the other half of the differential signal, thereby producing a second composite signal. The second adder 318 provides the second composite signal to the second line 332.

The channel 330 includes the first line 331 and the second line 332. The first and second lines 331, 332 have substantially the same length and electrical conductivity. The lengths of the channel 330 can vary widely depending on the distance between the first and second circuits 310, 320. In one embodiment, the length of the channel 130 can be between about 100 μm and about 10 mm. In another embodiment, the length of the channel 130 can be greater than 10 mm.

The second circuit 320 includes a first comparator 322, a second comparator 324, and a common-mode extractor 326. The first comparator 322 serves as a differential mode receiver. The second comparator 324 and the common-mode extractor 326 together serve as a common mode receiver. In alternative embodiments, each of the comparators 322, 324 may be replaced with a sense amplifier followed immediately by a latch.

The first comparator 322 receives the composite signals from the pair of conductive lines 331, 332, and detects the differential signals. The first comparator 322 compares the magnitudes of the pair of differential signals with each other, thereby recovering the original data in a single-ended (or differential) form. A skilled artisan will appreciate that various configurations of differential mode receivers can also be used in the second circuit 320.

The common-mode extractor 326 is configured to extract common-mode signals from the composite signals transmitted over the pair of electrically conductive lines 331, 332. The illustrated common-mode extractor 326 includes a voltage divider. The voltage divider includes a first resistor R1 and a second resistor R2 electrically connected via a node N1 in series between the pair of electrically conductive lines 331, 332. The voltage divider averages the composite signals from the pair of conductive lines 331, 332 such that a signal extracted from the node N1 is suitable for comparison with a reference voltage by the second comparator 324. In one embodiment, the first resistor R1 and the second resistor R2 have the same value, such as, but not limited to, a value between about 40 ohms and about 100 ohms. One of ordinary skill in the art will appreciate that the values of resistors R1, R2 will be dependent on the length of the channel and the frequency of data transmission. Thus, other values will be readily determined by one of ordinary skill in the art.

The second comparator 324 receives a signal from the node N1 of the common-mode extractor 326, and compares the signal with a reference voltage. The second comparator 324 outputs a single-ended control signal based at least partly on the comparison. A skilled artisan will appreciate that various configurations of common mode receivers can also be adapted for the second circuit 320.

In certain embodiments, the system 300 may further include one or more buffers between the channel 330 and the second circuit 320 to provide stable signals to the second circuit 320. The buffers may be part of the second circuit 320. In one embodiment, the second circuit 320 may further include a buffer between the channel 330 and the first comparator 322. In another embodiment, the second circuit 320 may further include another buffer between the channel 330 and the common mode extractor 326.

In other embodiments, the second circuit 320 may further include a low pass filter to filter out a differential signal from the composite signals. The low pass filter may provide an output to the common-mode extractor or directly to the second comparator 324.

Figure 4:
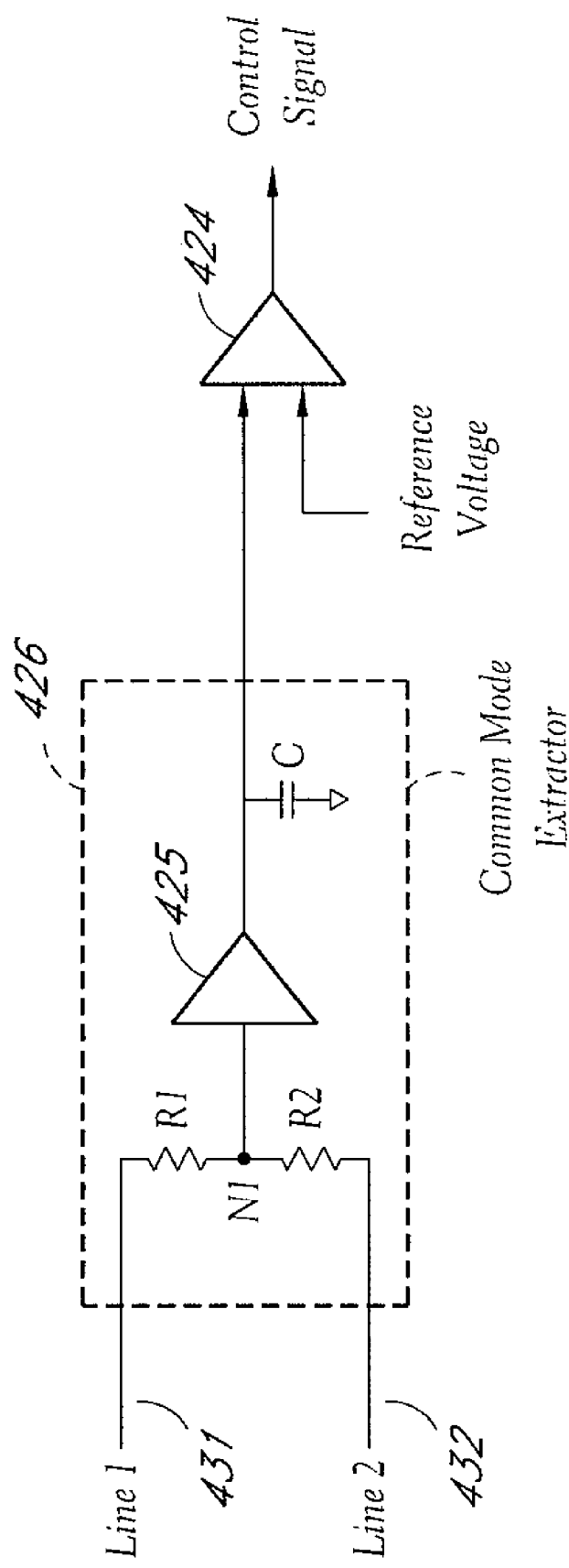

Referring to FIG. 4, another embodiment of a common-mode extractor will now be described below. In the illustrated embodiment, a common-mode extractor 426 includes a voltage divider R1 and R2, a buffer 425, and a capacitor C. The voltage divider includes a first resistor R1 and a second resistor R2 connected via a node N1 in series between a pair of electrically conductive lines 431, 432 forming a channel. The configuration of the common-mode extractor 426 can be as described above with respect to the common-mode extractor 326 of FIG. 3 except for the addition of the buffer 425 and the capacitor C.

The buffer 425 may be a unity-gain buffer that serves to isolate the channel from the capacitor C. The buffer 425 is configured to receive a signal from the node N1 and to provide an output to the capacitor C. In certain embodiments, the buffer 425 may be omitted.

The capacitor C includes a first terminal and a second terminal. The first terminal is electrically connected to the output of the buffer 425, and the second terminal is electrically connected to ground. The capacitor C serves to hold the output signal from the buffer 425 to enhance the accuracy of the comparator. An example of value for the capacitance of the capacitor C is 10 pF. Other values will be readily determined by one of ordinary skill in the art.

Figure 5:
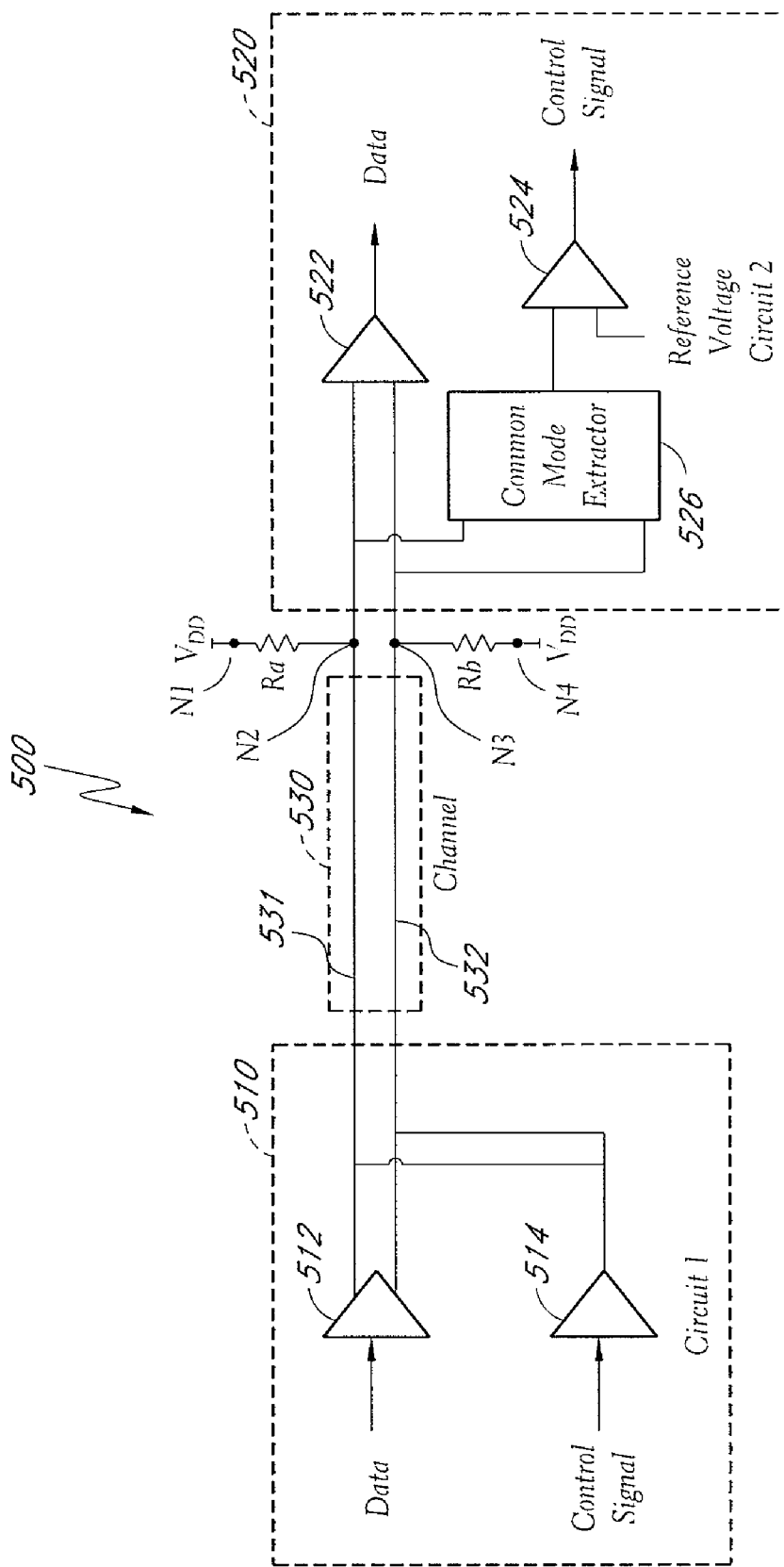
FIG. 5 is a circuit diagram of a signal transmission system using current mode signaling according to another embodiment.

Referring to FIG. 5, another embodiment of a system (or apparatus) employing a mixed-mode signaling scheme will now be described. The illustrated system 500 uses a current mode signaling scheme. The system 500 includes a first circuit 510, a second circuit 520, and a channel 530 interconnecting the first and second circuits 510, 520. The channel 530 includes a pair of electrically conductive lines: a first line 531 and a second line 532. The configurations of the foregoing components can be as described above with respect to those of the components of FIG. 3 except that the system 500 does not include adders for superimposing a differential signal with a common mode signal and that the system 500 further includes a first resistor Ra and a second resistor Rb.

Each of the two resistors Ra and Rb is electrically connected between a voltage source $V_{DD}$ and a respective one of the first and second lines 531, 532. In the illustrated embodiment, the first resistor Ra is connected between a first node N1 and a second node N2. The second resistor Rb is connected between a third node N3 and a fourth node N4. The first and fourth nodes N1, N4 are electrically connected to the voltage source $V_{DD}$. The second node N2 is electrically connected to the first line 531. The third node N3 is electrically connected to the second line 532. Currents flowing through the first and second resistors Ra, Rb generate voltage drops across the resistors Ra, Rb. There will be a difference between the voltage drops at the second and third nodes N2, N3 due to the difference in current magnitude (and possibly polarity, depending on how the transmitter is set up). That difference provides the differential signal. At the same time, a lower frequency shift in voltage will occur at both of the nodes N2, N3 as the common-mode of the differential signal shifts with the common mode signal. That will be ignored by the differential receiver 522, but will be captured by the common-mode extractor 526. A skilled artisan will appreciate that the mixed-mode signaling scheme can be adapted for various configurations of current mode systems.

Figure 6:
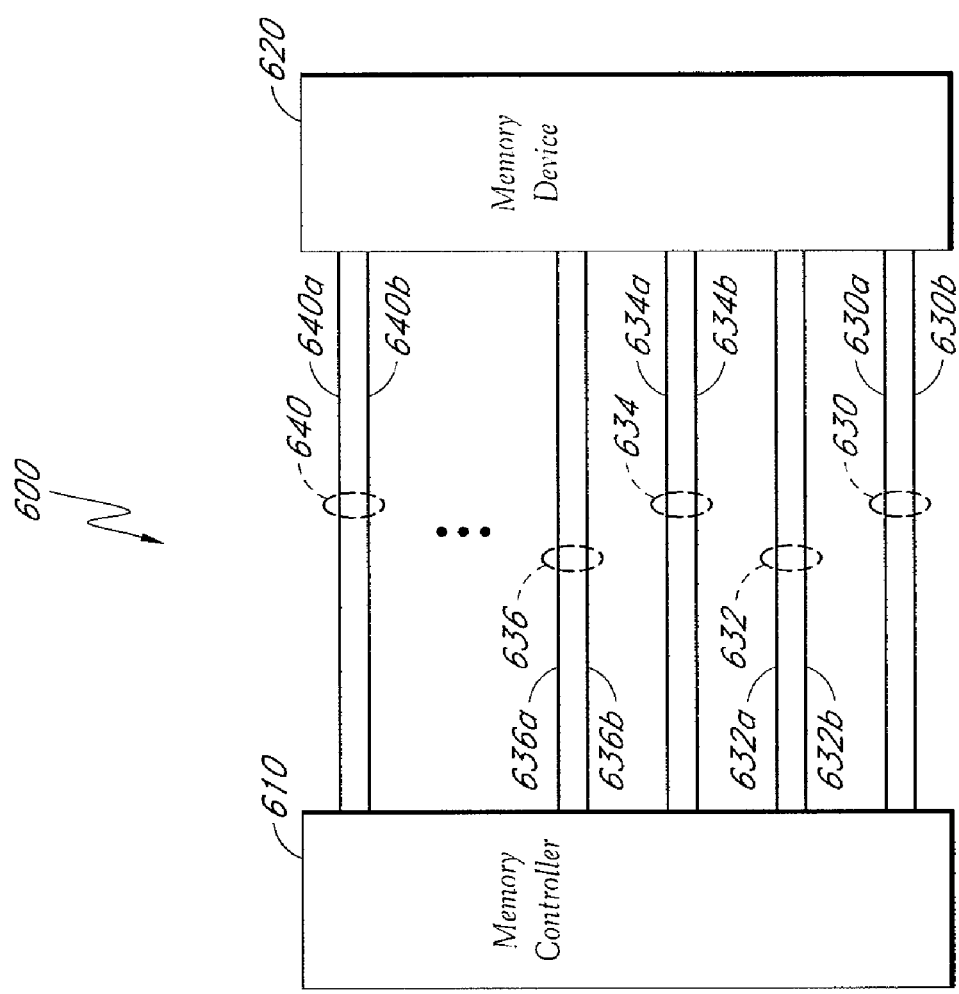
FIG. 6 is a block diagram of a system including a memory controller and a memory device, using a mixed-mode signaling scheme according to one embodiment.

Referring to FIG. 6, one embodiment of a system employing the mixed-mode signaling scheme of any of the foregoing embodiments will now be described. The illustrated system 600 includes a memory controller 610, a memory device 620, and a channel 630 interconnecting the memory controller 610 and the memory device 620.

The memory controller 610 is configured to provide electronic data along with control signals to the memory device 620 over the plurality of channels. Examples of control signals include, but are not limited to, a chip select (CS) signal, a power down signal, and a data mask signal. In an embodiment where a data bus inversion (DBI) scheme is used for transmitting electronic data, the control signal may carry information indicative of inverted data. The memory controller 610 may include a logic circuit configured to produce such control signals. The memory controller 610 may include one or more sets of differential transmitters and common mode transmitters, as described earlier with reference to FIGS. 1, 3, or 5. In certain embodiments, the DBI scheme may be applied solely to the common-mode control signals to minimize the transitioning of the common-mode signals to reduce their impact on the high-speed differential signals. A portion of the common-mode signals may carry information indicative of inverted control signals.

The memory device 620 is configured to receive the electronic data and the control signals. The memory device 620 is further configured to process and store the electronic data.

The memory device 620 may operate according to the control signals. Examples of memory devices include, but are not limited to, dynamic random access memories (DRAMs), read only memories (ROMs), and flash memories. The memory device 620 includes one or more sets of a differential receiver, a common mode receiver, and a common mode extractor, each of which can be as described above with reference to FIGS. 1, 3, and/or 5.

The channel 630 includes a plurality of pairs 630, 632, 634, 636, . . . , 640 of electrically conductive lines. One or more pairs of the electrically conductive lines are configured to carry composite signals having a differential signal superimposed with a common mode signal.

Because electronic data and control signals are transmitted over the same pair of electrically conductive lines, there is no need for additional lines or pins for the control signals. Thus, the memory controller 610 and the memory device 620 can use a narrower interconnect with less pins compared to conventional devices that do not use the mixed-mode signaling scheme described above.

The mixed-mode signaling schemes of the embodiments described above can be adapted for various electronic devices. Examples of the electronic devices can include, but are not limited to, consumer electronic products, electronic circuits, electronic circuit components, parts of the consumer electronic products, electronic test equipments, etc. Examples of the electronic devices can also include memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, etc. Further, the electronic device can include unfinished products.

One embodiment is an apparatus including a first transmitter configured to transmit a differential signal through a pair of electrically conductive lines in a first direction. The differential signal has a first frequency. The apparatus also includes a second transmitter configured to transmit a common mode signal through the pair of electrically conductive lines in the first direction such that the common mode signal is superimposed on the differential signal. The common mode signal has a second frequency that is lower than the first frequency.

Another embodiment is an apparatus including a first circuit configured to receive a differential signal transmitted over a pair of conductive lines in a direction. The differential signal has a first frequency. The apparatus also includes a second circuit configured to receive a common mode signal transmitted over the pair of conductive lines in the direction. The common mode signal is superimposed on the differential signal, and wherein the common mode signal has a second frequency that is lower than the first frequency.

Yet another embodiment is a system including a channel comprising a pair of electrically conductive lines, and a first circuit. The first circuit includes a first transmitter configured to transmit a differential signal through the pair of electrically conductive lines and a second transmitter configured to transmit a common mode signal through the pair of electrically conductive lines simultaneously with the differential signal. The differential signal carries data, and the common mode signal carries a control signal. The system further includes a second circuit configured to receive the differential signal and the common mode signal over the channel.

Yet another embodiment is a method including: transmitting a differential signal having a first frequency in a first direction over a pair of electrically conductive lines; and transmitting a common mode signal having a second frequency in the first direction over the pair of electrically conductive lines simultaneously with the differential signal. The second frequency is lower than the first frequency.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

I claim:

1. An apparatus comprising:
a first circuit of a first die comprising:
a first transmitter configured to transmit a differential signal through a pair of electrically conductive lines in a first direction, the differential signal having a first frequency; and
a second transmitter configured to transmit a common mode signal through the pair of electrically conductive lines in the first direction such that the common mode signal is superimposed on the differential signal, wherein the common mode signal has a second frequency that is lower than the first frequency; and
a second circuit of a second die configured to receive the differential signal and the common mode signal over a channel, wherein the second die is stacked over the first die, wherein the channel extends between the first circuit and the second circuit.

2. The apparatus of claim 1, wherein the second frequency is at least 8 times lower than the first frequency.

3. The apparatus of claim 1, wherein the first transmitter is configured to transmit data on the differential signal.

4. The apparatus of claim 3, wherein the second transmitter is configured to transmit a control signal on the common mode signal.

5. The apparatus of claim 4, wherein the control signal comprises at least one of chip select, power up/down, or data mask.

6. The apparatus of claim 3, wherein the second transmitter is configured to transmit information indicative of a status of controls on the common mode signal.

7. The apparatus of claim 3, wherein the second transmitter is configured to transmit information indicative of a status of the electronic data on the differential signal.

8. The apparatus of claim 7, wherein the information comprises data bus inversion (DBI) information.

9. The apparatus of claim 1, wherein the first transmitter comprises a first output driver configured to generate the differential signal based at least partially on data, wherein the second transmitter comprises a second output driver configured to generate the common mode signal based at least partially on one or more control signals.

10. The apparatus of claim 9, further comprising a pair of adders configured to superimpose the common mode signal onto the differential signal.

11. The apparatus of claim 9, wherein the first transmitter and the second transmitter are configured to transmit signals as currents.

12. The apparatus of claim 9, wherein the first transmitter and the second transmitter are configured to transmit signals as voltages.

13. An apparatus comprising:
a first circuit of a first die configured to receive a differential signal transmitted over a pair of electrically conductive lines in a direction, the differential signal having a first frequency; and
a second circuit of a second die configured to receive a common mode signal transmitted over the pair of electrically conductive lines in the direction via a channel, wherein the common mode signal is superimposed on the differential signal, wherein the common mode signal has a second frequency that is lower than the first frequency, wherein the second die is stacked over the first die, wherein the channel extends between the first circuit and the second circuit.

14. The apparatus of claim 13, wherein the second circuit comprises:
a first resistor and a second resistor arranged electrically in series between the pair of electrically conductive lines, wherein the first and second resistors are electrically connected via a node; and
a comparison circuit configured to receive an output signal from the node.

15. The apparatus of claim 14, wherein the second circuit further comprises a capacitor including a first end and a second end, the first end being electrically connected to the node, the second end being electrically connected to ground.

16. The apparatus of claim 13, wherein the second circuit comprises a low pass filter configured to filter out the differential signal.

17. A system comprising:
a channel comprising a pair of electrically conductive lines;
a first circuit comprising:
a first transmitter configured to transmit a differential signal through the pair of electrically conductive lines, wherein the differential signal carries data; and
a second transmitter configured to transmit a common mode signal through the pair of electrically conductive lines simultaneously with the differential signal, wherein the common mode signal carries a control signal; and
a second circuit configured to receive the differential signal and the common mode signal over the channel;
wherein the system comprises a first die comprising the first circuit, and a second die comprising the second circuit, the second die being stacked over the first die, and wherein the channel extends between the first and second circuits.

18. The system of claim 17, wherein the system comprises a memory controller and a memory, wherein the first circuit is associated with the memory controller, and wherein the second circuit is associated with the memory.

19. The system of claim 17, wherein the second circuit comprises:
a first receiver configured to convert the differential signal into a single-ended signal; and
a second receiver configured to extract the common mode signal into a single-ended signal.

20. The system of claim 17, wherein the channel comprises an electrically conductive plug disposed in a via penetrating through the second die.

21. A system comprising:
a channel comprising a pair of electrically conductive lines;
a first die comprising a first circuit, the first circuit comprising:
a first transmitter configured to transmit a differential signal through the pair of electrically conductive lines, wherein the differential signal carries data; and
a second transmitter configured to transmit a common mode signal through the pair of electrically conductive lines simultaneously with the differential signal, wherein the common mode signal carries a control signal; and
a second die stacked over the first die, the second die comprising a second circuit, the second circuit configured to receive the differential signal and the common mode signal over the channel, wherein the channel extends between the first circuit and the second circuit, the second circuit comprising:
a third transmitter configured to transmit a second differential signal through the pair of electrically conductive lines, wherein the second differential signal carries data; and
a fourth transmitter configured to transmit a second common mode signal through the pair of electrically conductive lines simultaneously with the second differential signal, wherein the second common mode signal carries a control signal; and
wherein the first circuit is further configured to receive the second differential signal and the second common mode signal over the channel.

22. The system of claim 17, wherein the channel has a length between about 100 μm and about 10 mm.

23. The system of claim 17, wherein the channel has a length greater than about 10 mm.

24. The system of claim 17, wherein the system comprises a printed circuit board.

25. A method of transmitting, the method comprising:
transmitting a differential signal having a first frequency in a first direction over a pair of electrically conductive lines; and
transmitting a common mode signal having a second frequency in the first direction over the pair of electrically conductive lines, simultaneously with the differential signal, wherein the second frequency is lower than the first frequency;
wherein the differential signal and the common mode signal are transmitted from a first die to a second die, wherein the second die is stacked over the first die.

26. The method of claim 25, wherein the second frequency is at least 8 times lower than the first frequency.

27. The method of claim 25, further comprising transmitting data on the differential signal, and transmitting control information on the common mode signal.

28. The method of claim 27, wherein the control information is indicative of a status of the data on the differential signal.

29. The method of claim 27, wherein at least a portion of the control information is indicative of a status of the remainder of the control information carried on the common mode signal.

30. The apparatus of claim 1, wherein the channel comprises an electrically conductive plug disposed in a via penetrating through the first die or the second die.

* * * * *